United States Patent [19]

Farrissey, Jr. et al.

[11] 4,077,922

[45] Mar. 7, 1978

[54] NOVEL COMPOSITIONS

[75] Inventors: William J. Farrissey, Jr., Northford; Karl W. Rausch, Jr., Hamden, both of Conn.

[73] Assignee: The Upjohn Company, Kalamazoo, Mich.

[21] Appl. No.: 706,573

[22] Filed: Jul. 19, 1976

Related U.S. Application Data

[63] Continuation-in-part of Ser. No. 389,944, Aug. 20, 1973, abandoned.

[51] Int. Cl.$^2$ .............................................. C08J 9/32
[52] U.S. Cl. ................................ 260/2.5 N; 260/37 N; 260/37 M
[58] Field of Search ........................ 260/2.5 N, 37 N

[56] References Cited

U.S. PATENT DOCUMENTS 2,978,340  4/1961  Veotch et al. ................... 260/2.5 B
3,708,458  1/1973  Alberino et al. ................. 260/6.3 N

OTHER PUBLICATIONS

Rand, An Aromatic Polyimide Syntactic Foam, Journal of Cellulos Plastics, May 1973, pp. 130-133.

Primary Examiner—Morton Foelak
Attorney, Agent, or Firm—Denis A. Firth; John Kekich

[57] ABSTRACT

Syntactic foams are described which consist of a spherical filler (microballoons, microspheres) embedded in a polyimide which is characterized by solubility in polar organic solvents and by thermoplasticity. These syntactic foams possess high structural strength, high resistance to deformation upon exposure to heat, and the ability to be subjected to further molding, e.g. for shaping and/or increase in density, if desired. These properties render the materials useful for a wide variety of structural and insulative applications e.g. in the preparation of mechanical parts and, using microballoons, lightweight, substantially non-burning, structural panels.

5 Claims, No Drawings

NOVEL COMPOSITIONS

This is a continuation of application Ser. No. 389,944 filed Aug. 20, 1973 now abondoned

BACKGROUND OF THE INVENTION

1. Field of the Invention

The present invention relates to novel polymer compositions and is more particularly concerned with novel syntactic foams having certain polyimides as the binding resin therein, and with methods for their preparation.

2. Description of the Prior Art

Syntactic foams, i.e. foams obtained by embedding a relatively low density hollow or solid spherical filler (microballoons or microspheres) in a plastic matrix, are well-known in the art. A variety of different types of spherical filler (fabricated from material such as glass and various synthetic polymers) and a variety of plastic matrices have been used; see, for example, U.S. Pat. Nos. 3,316,187, 3,325,341, 3,477,967 and 3,510,392.

We have now found that syntactic foams in which the polymer matrix comprises a particular type of copolyimide, are possessed of particularly valuable properties which render them useful in applications which will be described in detail hereafter.

SUMMARY OF THE INVENTION

This invention comprises a syntactic foam consisting of spherical filler particles embedded in a polyimide selected from the class consisting of:

(a) a copolyimide characterized by the recurring unit

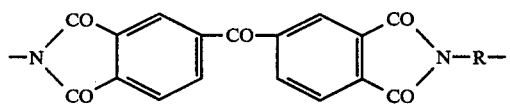  (I)

wherein from 10 to 30 percent of said recurring units are those in which R represents

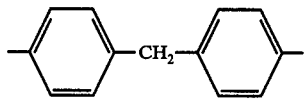

and the remainder of said units are those in which R represents a member selected from the group consisting of

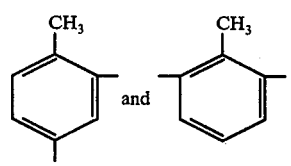

and mixtures thereof; and (b) a copolyimide characterized by the recurring unit

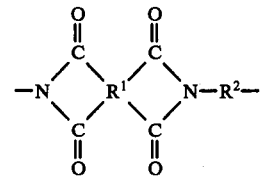  (II)

wherein, 75 to 100 percent of said recurring units, $R^1$ represents

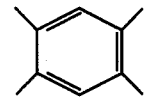

and, in the remaining 0 to 25 percent of said units, represents

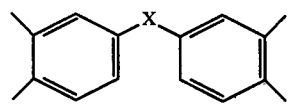

wherein X is a member selected from the group consisting of CO, O, and $SO_2$, and wherein, in 10 to 35 percent of said recurring units, $R^2$ represents

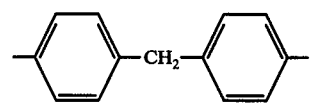

and, in the remaining 65 to 90 percent of said units, represents a member selected from the group consisting of

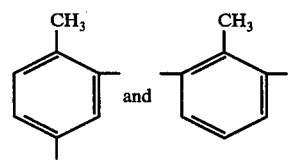

and mixtures thereof.

The syntactic foams of the invention are characterized by relatively lightweight (particularly where the filler is a hollow spherical particle), high structural strength, high resistance to deformation by heat, and, more particularly, the possession of sufficient thermoplasticity to permit further molding after initial formation. These properties will be discussed in more detail hereafter.

DETAILED DESCRIPTION OF THE INVENTION

The copolyimides having the recurring units (I) or (II) above, wherein R, $R_1$, and $R_2$ are as hereinbefore defined, are characterized by their solubility in organic dipolar aprotic solvents and by their thermoplasticity, i.e. unlike most polyimides heretofore known they can be molded relatively easily and exhibit good flowability under pressure molding conditions.

The copolyimides having the recurring unit (I), and methods for their preparation, are described in U.S. Pat. No. 3,708,458. The copolyimides having the recurring unit (II), and methods for their preparation, are disclosed in copending application Ser. No. 310,398 filed Nov. 29, 1972 in the names of Philip S. Andrews and William J. Farrissey, Jr. The disclosure of said copending application is hereby incorporated in its entirety into this aplication. Briefly, said copolyimides having the recurring unit (II) are obtained by reacting the appropriate polycarboxylic anhydride or mixture of anhydrides in appropriate proportions, with the appropriate molar proportions of either (i) a mixture of 4,4′ methylenebis(phenyl isocyanate) and toluenediisocyanate (2,4-isomer or 2,6-isomer or mixtures thereof) or (ii) a mixture of 4,4′-methylenebisaniline and toluenediamine (2,4-isomer or 2,6-isomer or mixtures thereof) under the conditions described in the aforesaid U.S. Pat. No. 3,708,458.

The reaction is conducted in the presence of a dipolar aprotic solvent and the reaction product is preferably not isolated from the resulting solution, but the latter is used without further treatment in the preparation of the syntactic foams of the invention. Thus, for reasons which are not fully understood at this time, the copolyimide having the recurring unit (II) is reasonably freely soluble in the reaction product solution obtained using the dipolar aprotic solvent as described above but, once isolated from the reaction product solution, is found to have a very much reduced solubility in the same solvents used to conduct the initial reaction.

The term "dipolar aprotic solvent" as used herein has the meaning normally attributed to it in the art and is inclusive of dimethyl sulfoxide, dimethylacetamide, hexamethylphosphoramide, N-methyl-2-pyrrolidone, tetramethylurea, pyridine, and the like.

The spherical fillers employed in the compositions of the invention can be any such fillers commonly employed in the preparation of syntactic foams. Such spherical fillers include hollow spherical particles, commonly known as "microballons", and solid spherical particles, commonly known as "microspheres". Advantageously, said spherical fillers have an average particle size (i.e. major diameter) in the range of about 10 microns to about 500 microns, and preferably in the range of about 20 microns to about 250 microns. The spherical fillers can be fabricated from a wide variety of materials including inorganic materials such as silica, glass, graphire, aluminum and the like, and organic polymers having heat resistance comparable to that of the polyimides used in the syntactic foams of this invention, such as epoxy resins, polycarbonates, phenolics, and the like. The spherical fillers, particularly those fabricated from organic polymers, can be strengthened, if desired, for example by coating or encapsulation with a liquid polymerizable monomer which coating is subsequently cured; see, for example U.S. Pat. No. 3,661,620. A particularly preferred filler for use in the foams of the invention is glass microballoons particularly those having an average major diameter of the order of about 20 microns to about 120 microns.

In fabricating the syntactic foams of the invention the spherical filler is blended intimately with a solution of the copolyimide in a dipolar aprotic solvent. The amount of filler employed is so chosen that the ultimate foam will contain from about 70 percent to about 85 percent by volume of said filler. Based on the required amount of filler in the end product, the concentration of copolyimide in the solution to be used in the blending process is so chosen as to require that volume of solution necessary to yield a blend having the consistency of soft putty. In general the concentration of copolyimide in said solution will vary within the range of about 15 percent to about 25 percent by weight depending upon the above considerations.

The blending operation can be carried out in any suitable apparatus conventionally employed in the art for blending of materials having a putty-like or dough-like consistency. In the initial stages of the blending, particularly where the amount of filler is in the higher end of the above quoted range, the mixture will appear to be dry and crumbly. However, as the blending proceeds, the desired putty-like consistency will be obtained as the filler becomes uniformly coated with polyimide solution.

When blending is complete the putty-like material is transferred to a closed mold having any desired configuration and is subjected to molding under pressures of the order of about 200 psi or higher. The upper limit on pressure employed at this stage is imposed only by the requirement that, in the case of the use of microballons as filler, the pressure should not be sufficient to crush said microballoons.

This pressure molding operation gives rise to a composite preform which still contains the bulk of the solvent employed in the original copolyimide solution and which possesses relatively low mechanical strength. This preform is removed from the mold, taking care not to deform the same in the handling operation, and is cured at elevated temperature to remove the solvent. It has been found that removal of solvent from the preform is facilitated by placing the preform on a sheet of porous material, such as loosely woven fiber glass cloth, fine mesh wire screen, sintered glass, sintered metal plate, and the like, while it is being cured. The temperature employed initially in the curing cycle is advantageously maintained substantially below the boiling point of the solvent until approximately 95 percent of the total solvent has been removed. Thereafter the temperature of curing is raised, advantageously in a gradual manner, until it is at, or above, the boiling point of the solvent and is maintained thereat until all solvent has been removed.

When the curing cycle is conducted in the above manner the ultimate product shows no signs of shrinkage or deformation and the surface remains planar and intact. As will be appreciated by one skilled in the art this necessarily means that pores have been created within the interior of the composite by removal of solvent. These pores are, of course, additional to any cellular nature imparted to the product by the use of microballoons as filler.

The cured polyimide syntactic foams so obtained in which the filler is in the form of microballoons, are of light weight having a density in the range of about 10 pcf to about 20 pcf depending upon the nature and proportion of spherical filler which is incorporated therein. The cured polyimide syntactic foams obtained as described above in which the filler is in the form of microspheres are of higher density depending upon the specific material from which the microspheres are derived and the proportion of these present in the product. The foams obtained using both types of filler show outstanding physical strength and resistance to deformation by exposure to heat, as is evident from the properties recorded in the specific examples set forth below. In addition to these excellent physical properties, the foams of the invention, because of the thermoplasticity of the polyimide employed in their preparation, are capable of being transformed into any other desired configuration by molding under appropriate heat and pressure conditions, even after being cured in the manner set forth above. As a variant on this, those foams which contain microballoons as filler can be subjected to crushing, if necessary in combination with molding to a different shape, to achieve higher density products. This feature of moldability and/or crushability renders the foams of the invention highly versatile and, to the best of our knowledge, unique.

The polyimide syntactic foams of the invention can be employed for all purposes for which polyimides are conventionally employed. The foams derived from microballoons are particularly useful in structural flame barrier and insulative applications where the relatively light weight and low flammability characteristics of the material are advantageous. By use of these latter foams of the invention it is possible to maintain substantially the same high structural strength and resistance to heat deformation present in the corresponding non-cellular polyimides but derive substantial benefit from the use of lighter weight material. The polyimide syntactic foams in which the filler is in the form of microspheres are particularly useful when molded in the form of bushings, seal faces, electric insulator, compressor vanes and impellers, piston rings, gears, thread guides, cams, brake linings, clutch faces, and the like.

If desired, the syntactic foams of the invention can also contain minor amounts of fillersand reinforcing materials such as chopped fiberglass, graphite powder, alumina, powdered metals such as aluminum, copper and the like as well as abrasives. Other additives such as pigments can be employed in the syntactic foams of the invention, if desired.

The following examples describe the manner and process of making and using the invention and set forth the best mode contemplated by the inventors of carrying out the invention but are not to be construed as limiting.

EXAMPLE 1

The polyimide employed in the following example was a copolyimide prepared by reacting 3,3',4,4'-tetracarboxylic acid dianhydride with a stoichiometric amount of a mixture containing 80 molar percent of toluene diisocyante and 20 molar percent of 4,4'-methylenebis (phenyl isocyanate) using the procedure set forth in Example 4 of U.S. Pat. No. 3,708,458.

A 20% w/w solution of the above copolyimide in N-methylpyrrolidone was prepared and 12.5 g. of this solution was intimately mixed by manual blending with 12.5 g. of glass microballoons (Eccospheres®FT-102 supplied by Emerson and Cuming Company; average diameter 90 microns). The resulting putty-like material was placed in a steel cylindrical mold (2 inches diameter × 1½ inches height) and molded at a pressure of 330 psi for a period of 10 minutes. The preform so obtained was carefully removed from the mold and placed on a sheet of fiber glass cloth in an oven at 80° C. The temperature of the oven was maintained thereat for 2 hours, then raised to 110° C for 2 hours and finally to 140° C for 2 hours. Thereafter the molding was heated in a furnace at 320° C for 4 hours. The resulting foam (A) contained 84 percent by volume of microspheres.

Using the same procedure, but increasing the amount of polyimide solution to 25g., there was obtained a second syntactic foam of the invention. The foam (B) contained 71.5 percent by volume of microspheres.

The two foams so obtained were tested and found to have the following physical properties.

|  | Foam A | Foam B |
|---|---|---|
| Average molded density: pcf | 15.79 | 16.43 |
| Average compression modulus: psi (3 samples) | 17,580 | 21,630 |
| Average compression strength: psi (3 samples) | 375 | 386 |

EXAMPLE 2

A sample of the syntactic foam (Foam A) prepared as described in Example 1 was subjected to molding at a pressure of 2000 psi and a temperature of 320° C to yield a disc having a density of 148 pcf i.e. an increase of 132.2 pcf due to crushing of the microspheres during the molding operation.

A second sample of the syntactic foam as described in Example 1 was subjected to molding in a cylindrical mold having dimensions (2 inches diameter × 1½ inches height) at a pressure of 200 psi and a temperature of 320° C. The foam was thereby remolded in the required configuration without a change in density.

EXAMPLE 3

Using the blending, molding and curing procedures set forth in Example 1, but replacing the glass microballoons there used by solid glass beads having an average particle diameter of 149 microns, or phenol-formaldehyde resin microballoons having an average particle diameter of 100 microns, there are obtained syntactic foams of the invention.

We claim:

1. A syntactic foam consisting of from 70 to 85 percent by volume of hollow spherical filler particles having an average diameter within the range of 10 microns to 500 microns embedded in a polyimide selected from the class consisting of (a) a copolyimide characterized by the recurring unit

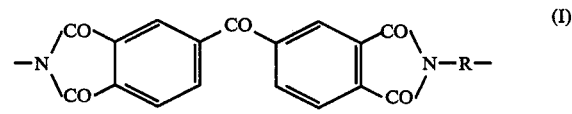

wherein from 10 to 30 percent of said recurring units are those in which R represents

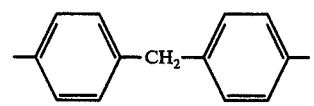

and the remainder of said units are those in which R represents a member selected from the group consisting of

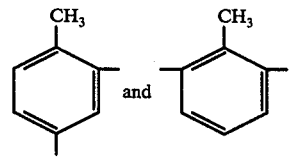

and mixtures thereof; and (b) a copolyimide characterized by the recurring unit

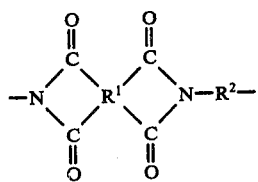 (II)

wherein, in 75 to 100 percent of said recurring units, $R^1$ represents

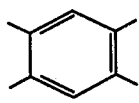

and, in the remaining 0 to 25 percent of said units, represents

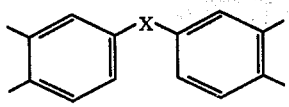

where X is a member selected from the group consisting of CO, O, and $SO_2$; and wherein, in 10 to 35 percent of said recurring units, $R^2$ represents

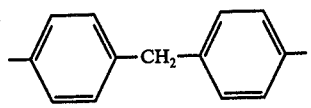

and, in the remaining 65 to 90 percent of said units represents a member selected from the group consisting of

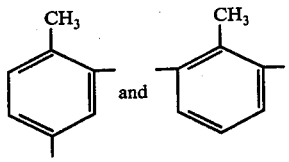

and mixtures thereof, said foam having been obtained by a process comprising the steps of:

admixing said hollow spherical particles with the appropriate amount of a solution containing from 15 to 25 percent by weight of said preformed polyimide in a dipolar aprotic solvent to obtain a product of putty-like consistency;

molding said putty-like material to a desired configuration under a pressure of at least about 200 psi but less than that required to crush said hollow spherical particles;

placing said molded material on a porous sheet;

heating said molded material on said porous sheet at a temperature below the boiling point of said dipolar solvent until about 95 percent of said solvent has been evaporated; and thereafter raising the temperature of said molded material to at least the boiling point of said dipolar solvent until the remainder of said solvent has been evaporated.

2. A syntactic foam according to claim 1 wherein the polyimide is a copolyimide characterized by the recurring unit of formula (I) wherein approximately 20 percent of said recurring units are those in which R represents

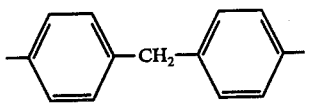

and the remainder of said units are those in which R represents a member selected from the group consisting of

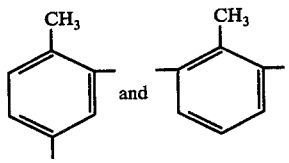

and mixtures thereof.

3. A syntactic foam according to claim 1 in which the spherical filler particles are hollow glass microspheres.

4. A syntactic foam according to claim 1 in which the spherical filler particles are aluminum microspheres.

5. A syntactic foam according to claim 1 in which the spherical filler particles are graphite microspheres.

* * * * *